May 28, 1935. M. F. MORAN 2,002,826
FILTER
Filed Oct. 30, 1933
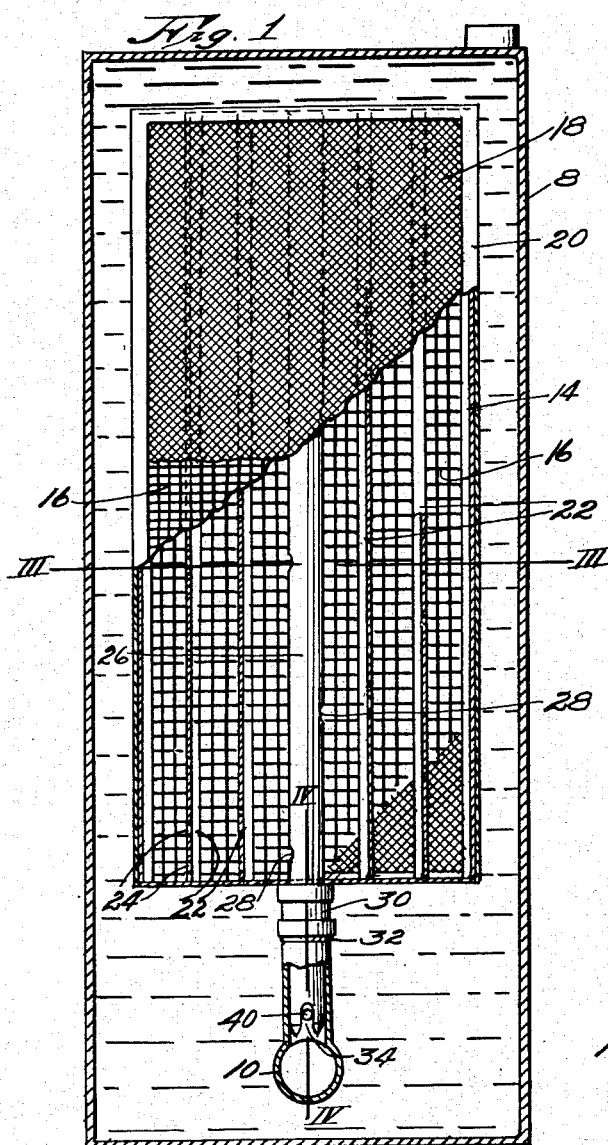
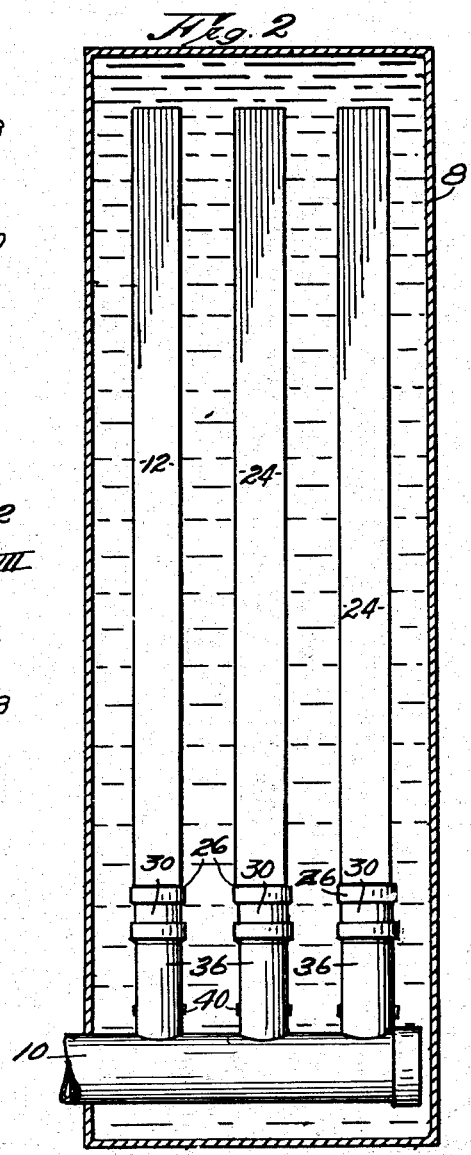
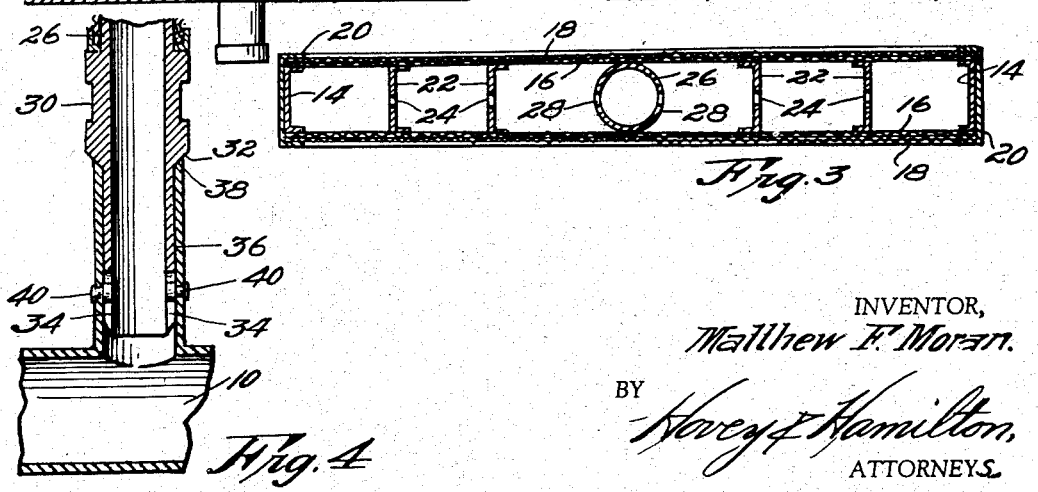
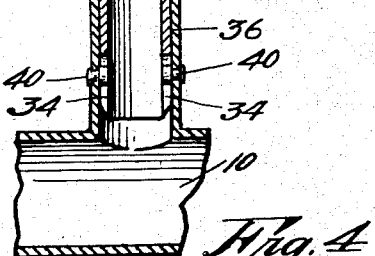
INVENTOR,
Matthew F. Moran.
BY Hovey F. Hamilton,
ATTORNEYS Patented May 28, 1935

2,002,826

UNITED STATES PATENT OFFICE 2,002,826

FILTER

Matthew F. Moran, Kansas City, Mo.

Application October 30, 1933, Serial No. 695,853

3 Claims. (Cl. 210—153)

This invention relates to filters for liquids of any character and has particular reference to hollow-leaf filters, wherein suitable substances are utilized to supplement the filtering action of the screen or cloth, and the primary object of the invention is to provide simple and durable filtering structure having means for properly positioning and maintaining a series of hollow filter leaves in proper related positions; means for removably affixing filtering screens in place; and the unique frame, from which projects an outlet pipe with means thereon for removably engaging a header.

Another object of this invention is to provide a joint between outlet pipe and header that will permit replacing of the hollow leaf of the filter without the necessity of manipulating clamps, bolts, screws or other members that are likely to cause difficulty and thereby require a large amount of time when replacement of any filter leaf becomes necessary.

Many minor structural details forming other objects of the invention will be made apparent during the course of the following specification, referring to the accompanying drawing, wherein:

Figure 1 is a vertical cross section through a filter made in accordance with this invention and having parts of the hollow filter leaf broken away for clearness.

Fig. 2 is another vertical cross section through a filter having a series of hollow filter leaves.

Fig. 3 is an enlarged cross section taken on line III—III of Fig. 1, and,

Fig. 4 is an enlarged, fragmentary, detailed, sectional view through the joint which establishes connection between the outlet pipe from the hollow filter leaf and the header of the filter.

Hollow filter leaves constructed as shown, require periodic cleaning, and it is with such leaves that the scraper and other structure shown in my copending application Serial Number 659,513, filed March 3, 1933, is used.

In the illustrated embodiment of the present invention is shown a retort 8, into which is introduced, under pressure, the liquid to be filtered and from which header 10 extends to remove the filtered liquid. A series of hollow leaf members is positioned within retort 8 and each is connected to header 10 through the medium of a novel joint shown in Fig. 4 and hereinafter more fully described. Each member 12 comprises a frame 14, preferably formed of channel iron or other suitable material, each side of which is closed by one or more layers of filter cloth or screen. In the instance shown, a coarse filter screen 16 is first applied to each side of frame 14, after which a screen 18 of appreciably finer mesh is applied and upon which collects such filtering powder or medium as may be introduced into retort 8.

A channel-shaped binder 20 may be used to secure screens 16 and 18 in place upon frame 14. When such is used, screens 16 and 18 are engaged at their edges between frame 14 and the normally parallel, laterally extended walls of binder 20, and because of the resilient property of this binder 20, it may be removed and replaced a large number of times as its effectiveness is retained.

Such filter leaves as embody this invention should have the side screens 16 and 18 thereof disposed in planes substantially parallel to each other and there should be means whereby collapsing or any inward bulge is precluded. Accordingly, a plurality of ribs 22 are employed, each of which extends from one side of frame 14 to the opposite side thereof and has a number of perforations 24 formed therethrough to permit free passage of the filtered liquid. Ribs 22 are substantially the same width as frame 14 and each rib 22 should be formed of channel iron to present a substantially flat surface, against which screens 16 and 18 will bear when liquid is being forced therethrough under high pressure.

An outlet pipe 26, having openings 28 formed therein extends from one side of frame 14 to and through the other side thereof to present a projected joint portion, formed as shown in Fig. 4. This projected portion of pipe 26 has an annular groove 30 formed therearound and an annular inclined shoulder 32, likewise formed thereon at a circumferential line spaced inwardly from the projected end of pipe 26. Two or more slots 34 are formed in pipe 26 at the projected end and extend inwardly longitudinally from said end, as shown. Referring to Fig. 1, it will be observed that slots 34 are flared at their outer portions to allow easy positioning over pins 40. Furthermore, pipe 26 is tapered at its outer end to facilitate its insertion in tube 36. Tube 36, integral with header 10, receives the projected end of pipe 26 so that a telescoping relation between pipe 26 and tube 36 is established and the surfaces which contact should be ground to present a liquid-tight joint.

The end of outwardly extending tube 36 has an inclined face 38 formed thereon, the angle of inclination thereof being the same as the angle of inclination of shoulder 32. When pipe 26 and tube 36 are telescoped, these two inclined faces are in engagement and the action of gravity upon the entire hollow leaf filter member 12 forces together the inclined faces to further insure positive liquid-tight joint. Stop pins 40 are carried by tube 36 and enter slots 34 to preclude relative rotation between pipe 26 and tube 36. When shoulder 32 and face 38 are in engagement, stop pins 40 are held a short distance away from the bottom or end of slots 34 so that the entire weight of member 12 is utilized in forcing together faces 32 and 38.

Obviously, from the foregoing it will be seen that the entire hollow leaf filter member 12 may be bodily lifted from its support without removal of any parts or loosening or other manipulation such as has heretofore been necessary.

The relation between openings 28 in pipe 26, openings 24 in ribs 22, and the mesh of screens 16 and 18 is such as to permit free passage of the liquid and in the event it is desired to place an auxiliary filter bag over the entire hollow leaf member 12, such may be done by using the conventional type of bag and securing it in place by drawing the mouth thereof into annular groove 30 which is formed for the purpose.

When such a filter construction is used with the cleaning devices shown in my aforementioned copending application, it will be found that the ease and speed of operation and the saving in operating cost will be a substantial amount, and when such leaf structure is used, the effective area thereof is greatly diminished for a given amount of work where a pressure of at least five pounds is built up.

Having thus described the invention, what is claimed as new and desired to be secured by Letters Patent is:

1. In a filter of the character described having a retort for receiving the liquid to be filtered and a header to remove the filtered liquid from the retort, a plurality of hollow leaf filter members removably mounted on the said header, each having an outlet pipe projecting from the leaf, an annular inclined shoulder formed around the projected portion of said outlet pipe, a tube integral with the header in telescoping engagement with the said outlet pipe, and an inclined face formed on the end edge of said tube bearing against the inclined annular shoulder and means associated with said pipe and tube to permit relative longitudinal movement and to preclude relative rotation thereof.

2. In a filter of the character described having a retort for receiving the liquid to be filtered and a header to remove the filtered liquid from the retort, a plurality of hollow leaf filter members removably mounted on the said header, each having a cylindrical outlet pipe projecting from the leaf, an annular inclined shoulder formed around the projected portion of said outlet pipe at a point spaced inwardly from the end thereof, slots formed in the outlet pipe at the projected end thereof and extending longitudinally inwardly therealong toward said shoulder and terminating in spaced relation thereto, a cylindrical tube integral with the header in telescoping engagement with the said projected end of the outlet pipe, an inclined face formed on the end of said tube for engagement with the said inclined shoulder to support the said filter member, and pins carried by the tube for engagement with the said slots, said pins precluding relative rotation of pipe and tube about their axes, said shoulder and inclined face being in engagement as the said pins are in the said slots between the ends of the latter.

3. In a filter of the character described, a hollow leaf member comprising an open frame, a series of perforated ribs extending between opposite sides of said frame, said ribs being equal in width to said frame, a filter screen on each side of the frame, an outlet pipe, having openings formed therein, within said hollow leaf, and means for removably securing said filter screens in place comprising a channel member having the parallel walls thereof in gripping engagement with the frame of said leaf, the said filter screen being between said frame and the said channel member.

MATTHEW F. MORAN.